Figure 1:
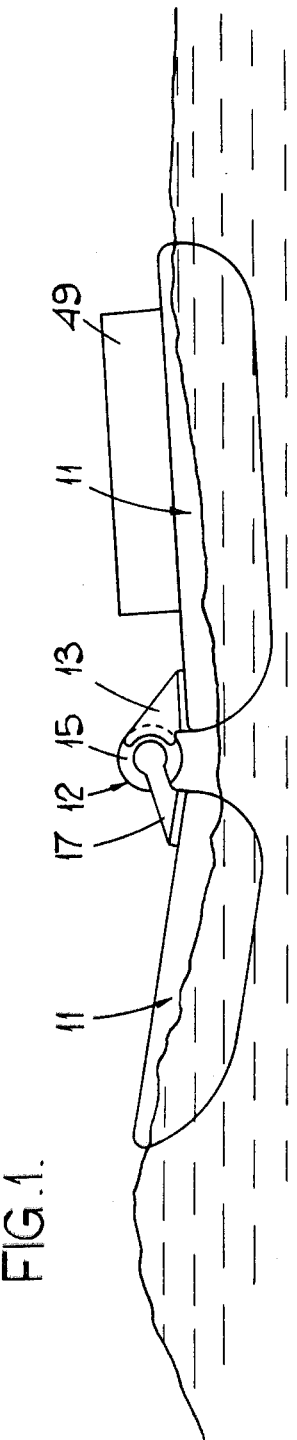

United States Patent [19]

Sivill

[11] 4,118,932
[45] Oct. 10, 1978

[54] ENERGY CONVERSION SYSTEMS

[75] Inventor: Alistair David Sivill, Birmingham, England

[73] Assignee: Lucas Industries Limited, Birmingham, England

[21] Appl. No.: 795,387

[22] Filed: May 10, 1977

[30] Foreign Application Priority Data

May 25, 1976 [GB] United Kingdom ............... 21600/76

[51] Int. Cl.² .......................... F03B 13/12; E02B 9/08
[52] U.S. Cl. ....................................... 60/500; 60/501; 60/416; 417/332
[58] Field of Search ................................. 60/497–507, 60/398; 417/330, 331, 332, 337; 290/53

[56] References Cited

U.S. PATENT DOCUMENTS

| 816,934 | 4/1906 | Newell | 60/500 |
|---|---|---|---|
| 917,411 | 4/1909 | Casella | 60/501 X |
| 1,078,323 | 11/1913 | Trull | 417/332 |
| 3,697,764 | 10/1972 | Stanziola | 290/53 X |
| 3,758,788 | 9/1973 | Richeson | 60/500 X |

*Primary Examiner*—Allen M. Ostrager
*Attorney, Agent, or Firm*—Andrus, Sceales, Starke & Sawall

[57] ABSTRACT

A system for converting wave energy from the sea into electrical energy, comprises a floatable assembly which, in use, is moored at sea and which is capable of internal movement in response to the action of waves. The assembly includes a hollow body mounted on a shaft and reciprocable angularly about the axis of the shaft in response to said internal movement. The body and the shaft define respective parts of a pump which also comprises a pair of spaced, opposed annular cam tracks extending around the axis of the shaft and rigidly connected to one of the pump parts defined by the body and the shaft, and at least one piston and cylinder arrangement disposed between the cam tracks and rigidly secured to the other of the pump parts so as to extend substantially parallel with the shaft axis. The cam tracks and the piston and cylinder arrangement thereby undergo relative angular movement about the shaft axis in response to wave-induced internal movement of the assembly, each of said cam tracks engaging an axially movable operating piston of said arrangement and being shaped so as to move the piston within the cylinder to displace fluid received in the cylinder in response to said relative angular movement. The system further comprises an electricity generator which can be driven in response to displacement of the fluid in the cylinder.

7 Claims, 5 Drawing Figures

U.S. Patent  Oct. 10, 1978  Sheet 1 of 3  4,118,932

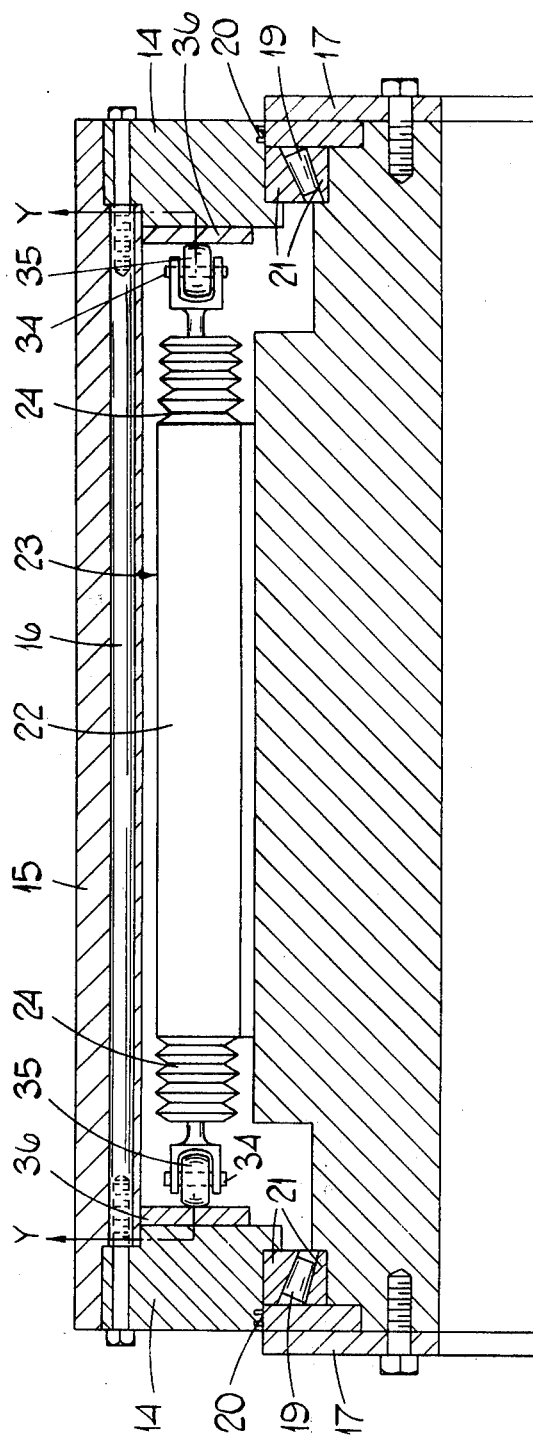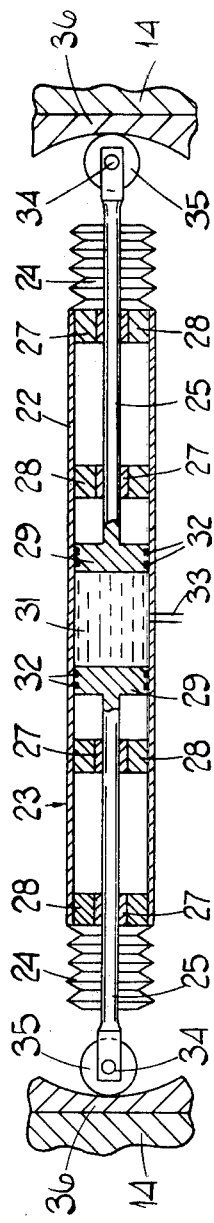

ENERGY CONVERSION SYSTEMS

This invention relates to energy conversion systems and, in particular, to a system for converting wave energy from the sea into electrical energy.

A system for converting wave energy from the sea into electrical energy, according to the invention, comprises a floatable assembly which, in use, is moored at sea and which is capable of internal movement in response to the action of waves, said assembly including a hollow body mounted on a shaft and reciprocable angularly about the axis of the shaft in response to said internal movement, said body and said shaft defining respective parts of a pump which also comprises a pair of spaced, opposed annular cam tracks extending around said axis and rigidly connected to one of the pump parts defined by the body and the shaft, and at least one piston and cylinder arrangement disposed between the cam tracks and rigidly secured to the other of said pump parts so as to extend substantially parallel with said axis, the cam tracks and the piston and cylinder arrangement thereby undergoing relative angular movement about said axis in response to wave-induced internal movement of said assembly, each of said cam tracks engaging an axially movable operating piston of said arrangement and being shaped so as to move said piston within said cylinder to displace fluid received in the cylinder in response to said relative angular movement, the system further comprising an electricity generator which can be driven in response to displacement of the fluid in the cylinder.

Preferably, said assembly includes a pair of buoyant, flotation members, one of said members being rigidly connected to said hollow body and the other member being rigidly connected to said shaft, the body and the shaft defining a coupling for the members whereby the members can float side-by-side in the sea and undergo relative angular movement about the shaft in response to the passage of waves.

Preferably each cam track includes a plurality of projections and depressions aligned with a plurality of corresponding projections and depressions respectively on the opposed cam track and the piston and cylinder arrangement has a pair of operating pistons which project from opposite ends respectively of the cylinder of said arrangement and engage at their free ends the cam tracks respectively.

Conveniently, the pump includes a plurality of said piston and cylinder arrangements disposed between, and angularly spaced around, the annular cam tracks.

Figure 2:
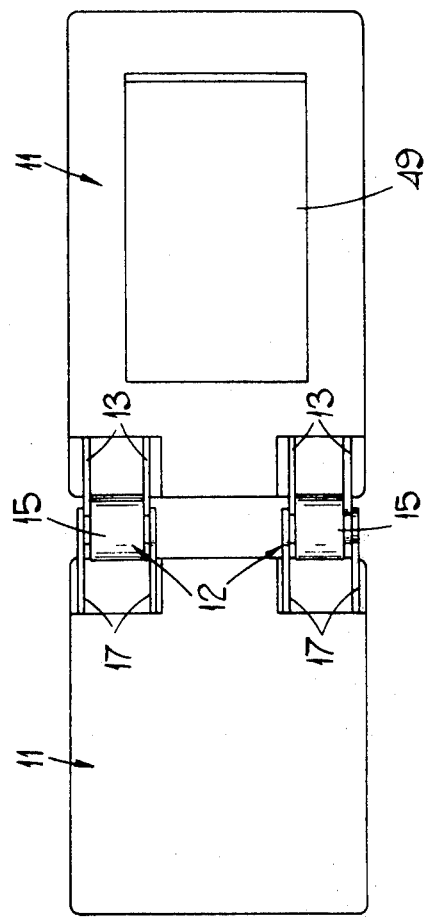
Figure 5:
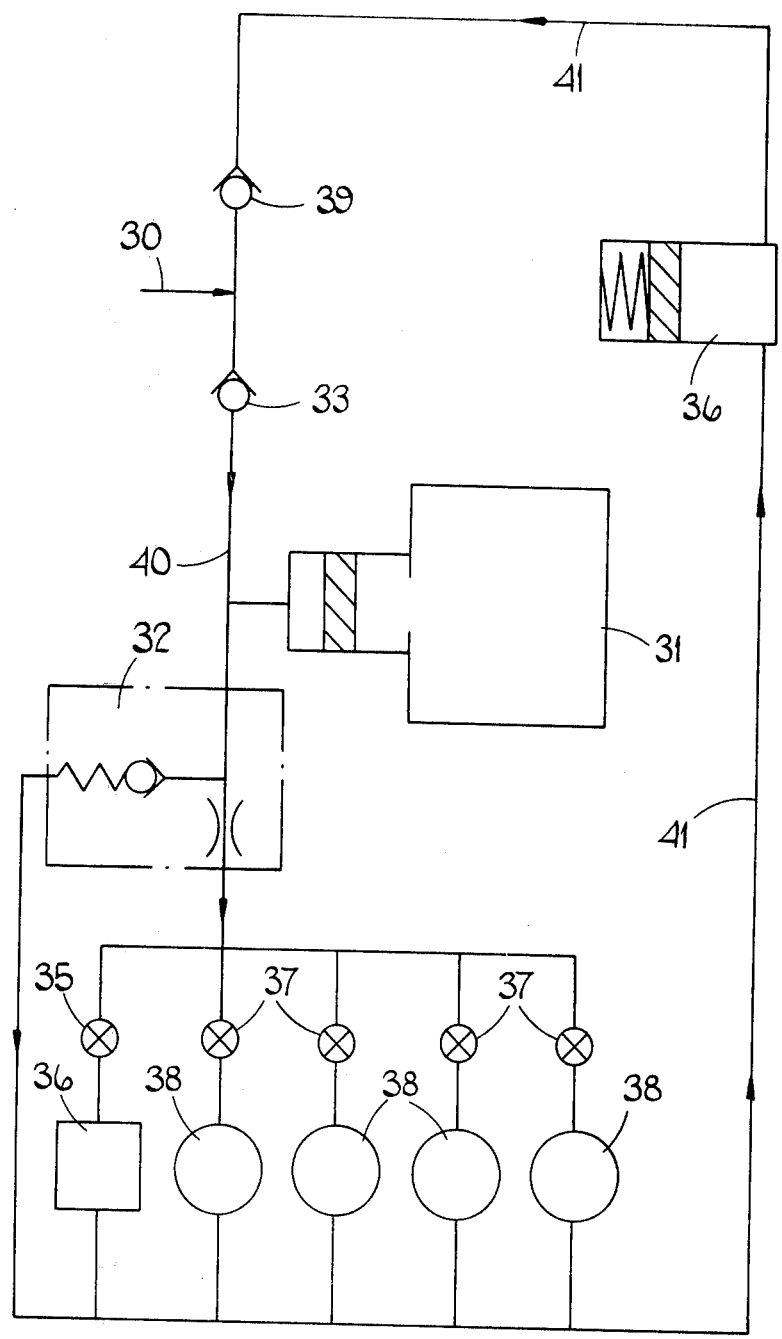

In the accompanying drawings, which illustrate one example of the invention,

FIG. 1 is a side view of a pair of buoyant flotation members coupled for angular reciprocal movement in response to wave energy from the sea, FIG. 2 is a plan view of FIG. 1, FIG. 3 is a sectional view of part of the coupling between the members shown in FIG. 1, FIG. 4 is a sectional view along Y—Y in FIG. 3, and FIG. 5 is a circuit diagram of the overall system.

Referring to the drawings, the system includes a plurality of buoyant flotation members 11 which are of generally rectangular configuration and which, in use, are moored at a convenient location in the sea so that incident waves pass along the length of the members. Each member 11 is conveniently a hollow concrete structure reinforced with steel and is connected to one or more adjacent members so as to form a chain which is moored so as to extend parallel with the direction of propogation of the waves. In the North Atlantic area, a typical dimension for each member would be 50m. wide, 30m. long and 8m. deep although, as shown in the drawings, the dimensions of the various members in a chain may vary considerably.

Each pair of adjacent members 11 is interconnected by two, spaced couplings 12 arranged to permit relative angular movement of the members about a common axis whereby, in use, the members can reciprocate angularly as they follow the undulating motion of the waves. As shown in FIGS. 2 and 3, each coupling includes a first pair of spaced brackets 13 which are bolted to one of the members 11 and which are secured at their free ends to respective annular end plates 14 closing the ends respectively of a hollow, cylindrical concrete body 15. The end plates 14 are secured by respective bolts to a plurality of steel reinforcing rods 16 which are cast within the hollow, concrete body 15 so as to be parallel with, and equiangularly spaced around, the body 15. Bolted to the other member 11 is a second pair of spaced brackets 17 which in turn are bolted to the ends respectively of a shaft 18, conveniently formed of steel or concrete. The shaft is mounted between the end plates 14 so as to extend coaxially with the body 15, with the interior of the body being sealed by Labyrinth seals 20 mounted between the end plates 14 and the brackets 17 respectively. Provided at each end of the shaft 18 are tapered steel rollers 19 which are mounted in steel bearing races 21 fixed respectively to the end plates 14 and the shaft 18 so as to permit relative angular movement of the body 15 and shaft 18 and hence of the members 11. The couplings 12 thereby provide the required pivotal connection between the members 11, while at the same time being of sufficiently rigid construction to resist the twisting forces experienced in use. However, to improve the resistance to these stresses, each pair of brackets 13, 18 is preferably provided with cross pieces joining the regions of the respective brackets bolted to the members 11.

Rigidly secured to the shaft 18 are the steel cylinders 22 of a plurality of piston and cylinder arrangements 23, the cylinders extending along the major part of the length of the shaft and being disposed equiangularly around the axis of the shaft. As shown best in FIG. 4, each cylinder 22 is provided at each end with a resilient bellows unit 24 which is welded to a respective piston rod 25 so that each arrangement 23 includes a pair of piston rods projecting from opposite ends respectively of its associated cylinder 22. The rods 25 of each arrangement 23 are slidably mounted in their cylinder 22 by means of recirculating ball, linear bearing assemblies 27 which are supported in resilient mountings 28, with the respective pistons 29 defining therebetween a chamber 31 which is isolated from the remainder of the cylinder by rubber sealing rings 32. Each chamber 31 is, in use, filled with hydraulic fluid and is connected on the hydraulic circuit of the overall energy conversion system by way of a conduit 33 extending through the cylinder wall.

At its end projecting from the associated unit 24, each piston rod 25 is bifurcated and supports between its forks an axle 34 on which a steel roller 35 is rotatably mounted. Each roller 35 runs on one of two annular steel cam members 36 which are secured to the end plates 14 respectively so as to be co-axial with the body 15 and shaft 18. Each cam member 36 presents to its associated rollers 35 a continuous, annular cam track including a plurality of projections and depressions which are aligned with a plurality of identical projections and depressions respectively on the other cam track. Thus when the members 11 undergo relative angular movement in response to waves flowing past them, the resulting relative angular movement of the body 15 and shaft 18 causes the rollers 35 to move over their associated cam members 36 whereby the piston rods 25 are urged to slide axially in their cylinders to increase or decrease the fluid pressure in the chambers 31. By virtue of aligned depressions and projections on the cam memberw, the two pistons 25 of each arrangement 15 undergo identical axial movement relative to their associated cylinder, the dimensions of the depressions and projections being arranged so that the pistons 29 complete one or more full strokes of movement in response to the angle of reciprocation (approximately 20°) imposed on the members 11 by the average wave motion acting on the members.

From the above, it will be appreciated that the assembly described defines a plurality of pumps each of which produces a variable output dependent on the incident wave energy. This output is in the form of a pressure variation in the conduits 33 and is harnessed to produce electrical power in the manner shown in FIG. 5.

Thus, turning to FIG. 5, which for the sake of simplicity shows only a single pump, the conduit 33 is connected by way of a non-return valve 37 to a fluid reservoir 38 and by way of an oppositely disposed further non-return valve 30 and a high pressure fluid line 41 to a plurality of fluid driven motors 42. The fluid flow through the line 41 to the motors is controlled by valves 43 associated with the motors respectively and by a high pressure accumulator 44 which is provided to store energy at times of large wave activity, to smooth the necessarily random power input, and maintain the pressure in the line 41 substantially constant. In use, when the pumps are producing an output in response to waves passing the members 11, fluid is caused to flow down the line 41 to drive the motors 42 and electrical generators (not shown) associated with the motors respectively, the low pressure fluid output from the motors being returned by way of a line 45 to the reservoir 38. The reservoir 38 accommodates any variations which may occur of fluid in the system and is arranged so that the pressure in the line 41, and hence the conduits 33 and chambers 31, is sufficient to maintain the rollers 35 in engagement with their respective cam members 36.

The line 41 is also connected to the reservoir 38 by a pressure relief valve 46 to cater for the extreme fluid pressure fluctuations which can occur in storm conditions. Moreover, part of the fluid flowing in use through the line 41 can be diverted under the control of a further valve 47 to one or more supplementary motors 48 for powering bilge pumps and air compressors indicated generally at 49. In this respect it is to be appreciated that the bilge pumps are provided to keep the members 11 and bodies 15 free of sea water, while the compressors are used to keep the interior of the bodies 15 above atmospheric pressure and thereby reduce the possibility of water ingress.

While in the preferred example described the opposed annular cam tracks having included a plurality of projections and depressions aligned with each other, i.e. the one track presents a surface which is a mirror image of the other, and a double piston arrangements has been used, it will be appreciated that other arrangements could be used. For example, each cam track could include a plurality of projections and depressions aligned with a plurality of corresponding depressions and projections respectively on the other cam track. In this case each piston and cylinder arrangement could conveniently have a single operating piston projecting from opposite ends respectively of the cylinder of the arrangement and engaging at its free ends the cam tracks respectively, fluid then being displaced by the piston moving in one or both directions within the cylinder.

I claim:

1. A system for converting wave energy from the sea into electrical energy, comprising a floatable assembly which, in use, is moored at sea and which is capable of internal movement in response to the action of waves, said assembly including a hollow body mounted on a shaft and reciprocable angularly about the axis of the shaft in response to said internal movement, said body and said shaft defining respective parts of a pump which also comprises a pair of spaced, opposed annular cam tracks extending around said axis and rigidly connected to one of the pump parts defined by the body and the shaft, and at least one piston and cylinder arrangement disposed between the cam tracks and rigidly secured to the other of said pump parts so as to extend substantially parallel with said axis, the cam tracks and the piston and cylinder arrangement thereby undergoing relative angular movement about said axis in response to wave-induced internal movement of said assembly, each of said cam tracks engaging an axially movable operating piston of said arrangement and being shaped so as to move said piston within said cylinder to displace fluid received in the cylinder in response to said relative angular movement, the system further comprising an electricity generator which can be driven in response to displacement of the fluid in the cylinder.

2. A system as claimed in claim 1 wherein said assembly includes a pair of buoyant, flotation members, one of said members being rigidly connected to said hollow body and the other member being rigidly connected to said shaft, the body and the shaft defining a coupling for the members whereby the members can float side-by-side in the sea and undergo relative angular movement about the shaft in response to the passage of waves.

3. A system as claimed in claim 2 wherein the interior of said body is sealed and pressurised.

4. A system as claimed in claim 2 wherein the interconnection between said pair of flotation members includes a further identical coupling which defines part of a further pump with at least one further piston and cylinder arrangement disposed between a further pair of opposed, annular cam tracks.

5. A system as claimed in claim 2 wherein said assembly includes a chain of said flotation members, adjacent members in the chain being interconnected by at least one of said couplings.

6. A system as claimed in claim 1 wherein each cam track includes a plurality of projections and depressions aligned with a plurality of corresponding projections and depressions respectively on the opposed cam track and the piston and cylinder arrangement has a pair of operating pistons which project from opposite ends respectively of the cylinder of said arrangement and engage at their free ends the cam tracks respectively.

7. A system as claimed in claim 1 wherein the pump includes a plurality of said piston and cylinder arrangements disposed between, and angularly spaced around, the annular cam tracks.

* * * * *